United States Patent
Chiang et al.

(10) Patent No.: US 9,438,132 B2
(45) Date of Patent: Sep. 6, 2016

(54) MULTILEVEL AC/DC POWER CONVERTING METHOD AND CONVERTER DEVICE THEREOF

(71) Applicant: Ablerex Electronics Co., Ltd., New Taipei (TW)

(72) Inventors: Wen-Jung Chiang, Kaohsiung (TW); Chien-Ming Huang, Kaohsiung (TW); Wen-Jie Hou, Kaohsiung (TW)

(73) Assignee: Ablerex Electronics Co., Ltd., New Taipei (TW)

( * ) Notice: Subject to any disclaimer, the term of this patent is extended or adjusted under 35 U.S.C. 154(b) by 0 days.

(21) Appl. No.: 14/227,321

(22) Filed: Mar. 27, 2014

(65) Prior Publication Data

US 2014/0301119 A1 Oct. 9, 2014

(30) Foreign Application Priority Data

Apr. 3, 2013 (TW) .............................. 102112069 A (51) Int. Cl.
*H02M 1/42* (2007.01)
*H02M 7/483* (2007.01)
*H02M 7/217* (2006.01)

(52) U.S. Cl.
CPC ........... *H02M 7/217* (2013.01); *H02M 1/4216* (2013.01); *H02M 7/483* (2013.01); *H02M 2007/4835* (2013.01); *Y02B 70/126* (2013.01)

(58) Field of Classification Search
CPC ........... H02M 1/4216; H02M 1/4233; H02M 7/217–7/219

USPC ......................... 363/34, 39, 44–48, 123–127
See application file for complete search history.

(56) References Cited

U.S. PATENT DOCUMENTS

| | | | |
|---|---|---|---|
| 7,138,789 B2 | 11/2006 | Moussaoui et al. | |
| 7,433,212 B2* | 10/2008 | Igarashi et al. | 363/68 |
| 7,710,748 B2 | 5/2010 | Young | |
| 2006/0164875 A1* | 7/2006 | Colombi et al. | 363/125 |
| 2009/0116268 A1* | 5/2009 | Kishida et al. | 363/68 |
| 2011/0280049 A1* | 11/2011 | Mori et al. | 363/25 |
| 2013/0063994 A1* | 3/2013 | Alexander | 363/123 |

* cited by examiner

*Primary Examiner* — Timothy J Dole
*Assistant Examiner* — Sisay G Tiku
(74) *Attorney, Agent, or Firm* — Alan D. Kamrath; Kamrath IP Lawfirm, P.A.

(57) ABSTRACT

A multilevel AC/DC power converter device includes a high-frequency power converter including a first AC port and a low-frequency power converter including a second AC port and a DC port. A power converting method includes: serially connecting the first AC port of the high-frequency power converter and the second AC port of the low-frequency power converter; operating frequency of the low-frequency power converter synchronized with frequency of an AC power source and operating the high-frequency power converter with high-frequency PWM to generate a multilevel AC voltage; and controlling the multilevel AC voltage to obtain a current of an input AC port being sinusoidal and in a same phase with a voltage of the AC power source. Accordingly, the input power factor approaches unity and the low-frequency power converter supplies a DC voltage to a load via a DC output port.

15 Claims, 5 Drawing Sheets

MULTILEVEL AC/DC POWER CONVERTING METHOD AND CONVERTER DEVICE THEREOF

BACKGROUND OF THE INVENTION

1. Field of the Invention

The present invention relates to a multilevel AC/DC power converting method and converter device thereof. More particularly, the present invention relates to the multilevel AC/DC power converting method and converter device thereof for enhancing the efficiency of power conversion.

2. Description of the Related Art

In general, a conventional AC/DC power converter circuit includes a diode rectifier, a thyristor phase-controlled rectifier or the like. However, an input AC current of the diode rectifier or the thyristor phase-controlled rectifier contains serious harmonic distortion and a relatively low input power factor. Disadvantageously, the harmonic distortion generated from the diode rectifier or the thyristor phase-controlled rectifier fails to meet the requirements of a harmonic control standard.

Furthermore, the conventional AC/DC power converter circuit also includes a high-frequency power converter which is formed with a structure of bridge-type power electronic switches. The power electronic switches of the high-frequency power converter are controlled by high-frequency PWM (Pulse Width Modulation) to adjust an input current approaching to a sinusoidal waveform and a phase of the input current same with that of a voltage of the AC power source, such that it can approach to a unity of the input power factor. However, in switching the power electronic switches of the high-frequency power converter with high frequency, a higher switching power loss occurs due to a higher voltage change in each switching operation. Disadvantageously, it results in a lower efficiency of power conversion.

For example, U.S. PATENT PUBLICATION No. 20080031014 entitled "AC/DC Converter Comprising Plural Converters" and U.S. PATENT PUBLICATION No. 20050156579 entitled "Multiphase Converter With Zero Voltage Switching" disclose various power converters. The above-mentioned patents and publications are incorporated herein by reference for purposes including, but not limited to, indicating the background of the present invention and illustrating the state of the art.

In order to reduce the switching power loss in high-frequency switching, the voltage change in each switching operation of the power electronic switch must be reduced. Hence, a multilevel AC/DC power converter device is developed. A structural circuit of the multilevel AC/DC power converter device mainly includes a diode-clamping type, a flywheel capacitor type and a cascade bridge type. The voltage change in each switching operation of the power electronic switch of the multilevel AC/DC converter device is reduced and generates a multilevel AC voltage at an input terminal. Consequently, the multilevel AC/DC power converter device reduces the switching power loss, increases the efficiency of power conversion, and reduces filtering inductances and degrees of electromagnetic interferences.

The cascade bridge type requires the least number of power electronic switches if the three types of the above-mentioned multilevel AC/DC power converter device are designed to generate the same levels of AC input voltage. However, each power converter of the conventional cascade bridge-type AC/DC power converter device must be controlled by high-frequency PWM which results in a complication of the driving circuit and a higher degree of switching power loss. Furthermore, the conventional cascade bridge-type AC/DC power converter device has a critically technical limit, since each power converter must output a DC power. Unavoidably, the conventional cascade bridge-type AC/DC power converter device must have several separate DC outputs formed with no common connection point. Accordingly, an additional power conversion circuit must be applied to integrate all of the separate DC outputs into a single DC output which further results in a complication of the power circuit and a higher degree of switching power loss.

As is described in greater detail below, the present invention provides a multilevel AC/DC power converting method and converter device thereof. A cascade structure of the multilevel AC/DC power converter device is formed from a high-frequency power converter and a low-frequency power converter serially connected. A DC voltage of the low-frequency power converter is relatively high and operated by low-frequency switching, while a DC voltage of the high-frequency power converter is relatively low and operated by high-frequency switching. In comparison with the conventional cascade structure, it can reduce the switching loss and can increase the efficiency of power conversion. Due to only outputting a DC power at the low-frequency power converter, no real power will be input or output at the high-frequency power converter, and, thus, no additional power conversion circuit will be provided for integrating all separate DC outputs into a single DC output. Advantageously, the entire structure is further simplified, and the manufacturing cost is further reduced in such a way to mitigate and overcome the above problem.

SUMMARY OF THE INVENTION

The primary objective of this invention is to provide a multilevel AC/DC power converting method and converter device thereof. The multilevel AC/DC power converter device connects between an AC power source and a load. The multilevel AC/DC power converter device is operated to convert an electric power supplied from the AC power source into a stable DC power to supply to the load. Advantageously, the present invention is accordingly successful in increasing the efficiency of power conversion, reducing the total dimensions and manufacturing cost and lowering electromagnetic interference.

The multilevel AC/DC power converting method in accordance with an aspect of the present invention includes:

connecting a high-frequency power converter and a low-frequency power converter between an AC power source and a load;

providing a first AC port of the high-frequency power converter and a second AC port of the low-frequency power converter, and serially connecting the first AC port of the high-frequency power converter to the second AC port of the low-frequency power converter to form a cascade bridge-type multilevel rectifier structure;

operating the low-frequency power converter with a frequency identical with a frequency of the AC power source;

operating the high-frequency power converter with high-frequency PWM to generate a multilevel AC voltage from a serial connection of the low-frequency power converter and the high-frequency power converter;

controlling the multilevel AC voltage for a current of an AC input port approaching to a sinusoidal waveform and identical with a phase of a voltage of the AC power source, thereby operating a power factor approach to unity; and controlling a DC voltage output from the low-frequency power converter to supply to the load via a DC output port.

The multilevel AC/DC power converter device in accordance with a separate aspect of the present invention includes:

an AC input port connecting with an AC power source;

a high-frequency power converter including a first AC port;

a low-frequency power converter including a second AC port and a DC port, with the first AC port of the high-frequency power converter serially connected to the second AC port of the low-frequency power converter to form a cascade bridge-type multilevel rectifier structure;

a filter circuit connecting between the first AC port of the high-frequency power converter and the AC input port for filtering harmonics; and a DC output port connecting with the DC port of the low-frequency power converter and supplying a stable DC power to at least one load.

The low-frequency power converter is operated with a frequency identical with a frequency of the AC power source. The high-frequency power converter is operated with high-frequency PWM to generate a multilevel AC voltage from a serial connection of the low-frequency power converter and the high-frequency power converter. The multilevel AC voltage is controlled for a current of an AC input port approaching to a sinusoidal waveform and identical with a phase of a voltage of the AC power source, thereby operating a power factor approach to unity. A DC voltage output from the low-frequency power converter is controlled to supply to the load via the DC output port.

In a separate aspect of the present invention, the high-frequency power converter includes three single-phase full-bridge power converters and three DC capacitors.

In a further separate aspect of the present invention, each of the single-phase full-bridge power converters includes an AC terminal which comprises a first terminal point and a second terminal point performed as the first AC port.

In yet a further separate aspect of the present invention, the low-frequency power converter includes a three-phase diode rectifier, a DC capacitor, a DC terminal performed as the DC port and an AC terminal performed as the second AC port.

In yet a further separate aspect of the present invention, the second AC port of the low-frequency power converter includes three AC terminal points each of which connects with the corresponding second terminal points of the AC terminals of the single-phase full-bridge power converters.

In yet a further separate aspect of the present invention, DC voltages of the three single-phase full-bridge power converters are controlled to adjust an output voltage of the DC port of the low-frequency power converter, such that no real power is input or output from the three single-phase full-bridge power converters.

In yet a further separate aspect of the present invention, DC buses of the three single-phase full-bridge power converters connect with the corresponding DC capacitors and are not applied to output DC power therefrom, such that no additional power conversion circuit is applied to integrate DC outputs from the three single-phase full-bridge power converters into a single DC output to the DC output port.

In yet a further separate aspect of the present invention, the DC voltages of the three single-phase full-bridge power converters are higher than or equal to a half voltage of the DC port of the low-frequency power converter.

In yet a further separate aspect of the present invention, the high-frequency power converter includes two single-phase full-bridge power converters and two DC capacitors, with each of the single-phase full-bridge power converters including an AC terminal which comprises a first terminal point and a second terminal point performed as the first AC port, and with the second AC port of the low-frequency power converter including a first terminal point, a second terminal point and a third terminal point, with the first terminal point and the second terminal point of the second AC port of the low-frequency power converter selectively connecting with the second terminal points of the AC terminals of the single-phase full-bridge power converters while the third terminal point of the second AC port of the low-frequency power converter selectively connecting with the AC input port via the filter circuit.

In yet a further separate aspect of the present invention, the AC input port includes an additional terminal connecting with a neutral line of a three-phase four-wire power source, and the low-frequency power converter includes two DC capacitors whose serial connection points further connect with the additional terminal of the AC input port.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a multilevel AC/DC power converting method and a converter device thereof in accordance with the preferred embodiment of the present invention can be applicable to various AC/DC power converter devices, which are not limitative of the present invention. The multilevel AC/DC power converter device in accordance with the preferred embodiment of the present invention is suitable for various AC power sources, for example: including a three-phase three-wire AC power source or a three-phase four-wire AC power source.

Figure 1:
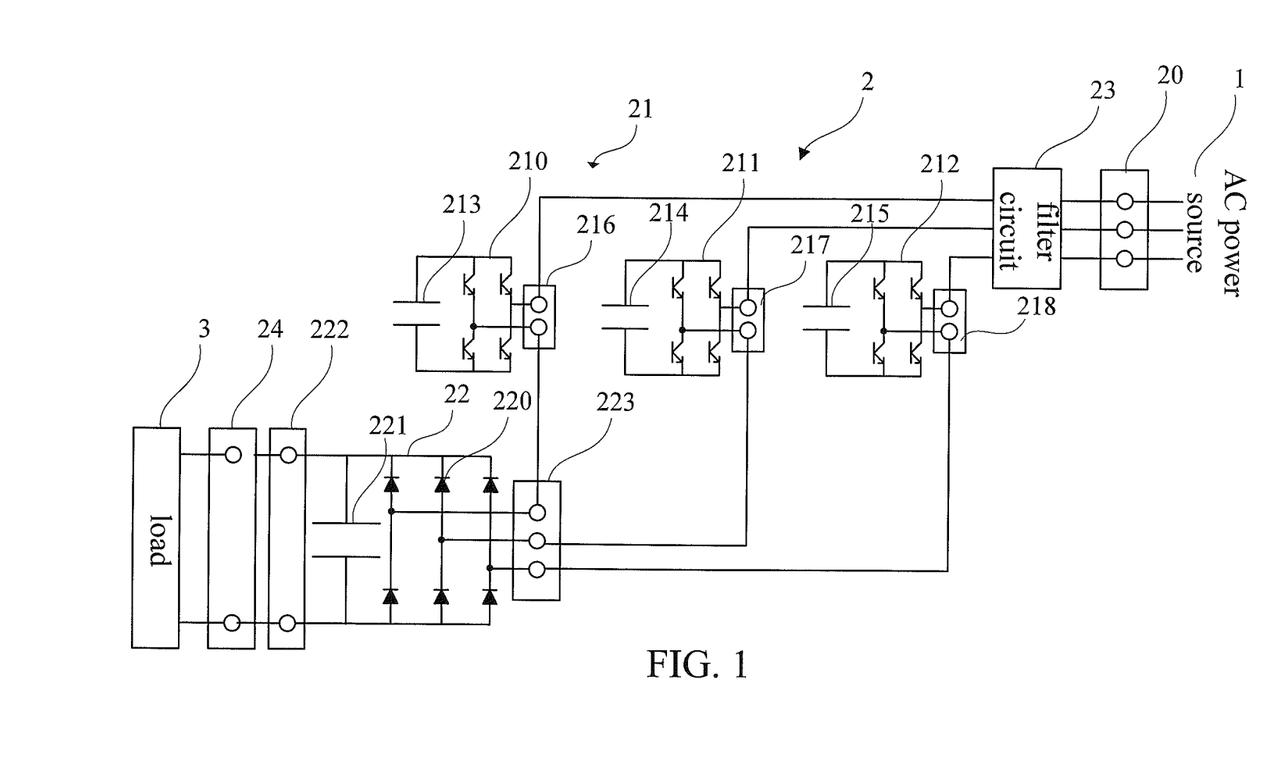
FIG. 1 is a schematic diagram of a structure of a multilevel AC/DC power converter device in accordance with a first preferred embodiment of the present invention.

FIG. 1 shows a structure of a multilevel AC/DC power converter device in accordance with a first preferred embodiment of the present invention, which is not limitative of the present invention. Referring to FIG. 1, the multilevel AC/DC power converter device 2 connects between an AC power source 1 and a load 3. The multilevel AC/DC power converter device 2 is operated to convert AC power into DC power and to supply a DC voltage generated therefrom to the load 3. The AC power source 1 is selected from a three-phase three-wire power source, for example.

Still referring to FIG. 1, the multilevel AC/DC power converter device 2 includes an AC input port 20, a high-frequency power converter 21, a low-frequency power converter 22, a filter circuit 23 and a DC output port 24. The AC input port 20 connects with the AC power source 1, while the DC output port 24 connects with the load 3. The high-frequency power converter 21 has a first AC port, while the low-frequency power converter 22 has a DC port 222 and a second AC port 223.

Still referring to FIG. 1, the multilevel AC/DC power converting method includes: arranging or connecting the high-frequency power converter 21 and the low-frequency power converter 22 between the AC power source 1 and the load 3; and providing a serial connection of the first AC port of the high-frequency power converter 21 to the second AC port 223 of the low-frequency power converter 22 to form a cascade bridge-type multilevel rectifier structure.

Still referring to FIG. 1, the AC input port 20 electrically connects with the AC power source 1, the second AC port 223 of the low-frequency power converter 22 serially connects with the first AC port of the high-frequency power converter 21, and the first AC port of the high-frequency power converter 21 further electrically connects with the AC input port 20 via the filter circuit 23. Furthermore, the DC port 222 of the low-frequency power converter 22 electrically connects with the DC output port 24, and the DC output port 24 further electrically connects with the load 3.

Still referring to FIG. 1, the multilevel AC/DC power converting method further includes: operating the low-frequency power converter 22 with a frequency identical with a frequency of the AC power source 1; further operating the high-frequency power converter 21 with high-frequency PWM to generate a multilevel AC voltage from a serial connection of the low-frequency power converter 22 and the high-frequency power converter 21; further controlling the multilevel AC voltage for a current of the AC input port 20 approaching to a sinusoidal waveform and identical with a phase of a voltage of the AC power source 1, thereby operating the power factor of the AC input port 20 approach to unity; and further controlling a DC voltage output from the low-frequency power converter 22 to supply to the load 3 via the DC output port 24.

With continued reference to FIG. 1, the high-frequency power converter 21 includes three single-phase full-bridge power converters 210, 211, 212 and three DC capacitors 213, 214, 215. The single-phase full-bridge power converters 210, 211, 212 include three AC terminals 216, 217, 218 performed as the first AC port and each of which further includes a first terminal point and a second terminal point. Each first terminal point of the AC terminals 216, 217, 218 connects with the AC input port 20 via the filter circuit 23. The low-frequency power converter 22 includes a three-phase diode rectifier 220, a DC capacitor 221, a DC terminal performed as the DC port 222 and an AC terminal performed as the second AC port 223. The three-phase diode rectifier 220 and the DC capacitor 221 are provided between the DC port 222 and the second AC port 223. The second AC port 223 of the low-frequency power converter 22 includes three AC terminal points which correspondingly connect with the second terminal points of the AC terminals 216, 217, 218 of the single-phase full-bridge power converters 210, 211, 212, thereby forming a serial connection structure.

With continued reference to FIG. 1, the single-phase full-bridge power converters 210, 211, 212 of the high-frequency power converter 21 are operated with high-frequency PWM to generate a multilevel AC voltage from a serial connection of the low-frequency power converter 22 and the high-frequency power converter 21. DC voltages of the single-phase full-bridge power converters 210, 211, 212 are controlled to adjust an output voltage of the DC port 222 of the low-frequency power converter 22 and thus to control an amplitude of input currents of the AC input port 20. Since the values of the DC voltages of the single-phase full-bridge power converters 210, 211, 212 and the low-frequency power converter 22 are appropriately arranged, no real power is input or output from the single-phase full-bridge power converters 210, 211, 212. Advantageously, DC buses of the single-phase full-bridge power converters 210, 211, 212 connect with the corresponding DC capacitors 213, 214, 215 and are not applied to output DC power therefrom, such that no additional power conversion circuit is applied to integrate DC outputs from the single-phase full-bridge power converters 210, 211, 212 into a single DC output to the DC output port 24.

In a preferred embodiment, the DC voltages of the single-phase full-bridge power converters 210, 211, 212 are higher than or equal to a half voltage of the DC port 222 of the low-frequency power converter 22. By way of example, when the DC port 222 of the low-frequency power converter 22 is $V_{dc}$, the DC voltages of the single-phase full-bridge power converters 210, 211, 212 are about $V_{dc}/2$, and, thus, the serial connection structure of the low-frequency power converter 22 and the single-phase full-bridge power converters 210, 211, 212 generates a multilevel AC voltage. The single-phase full-bridge power converters 210, 211, 212 are operated with high-frequency PWM, such that the input current of the AC input port 20 approaches to a sinusoidal waveform and identical with a phase of a voltage of the AC power source 1, thereby operating the power factor of the AC input port 20 approach to unity. Furthermore, adjusting an amplitude of the input current can control real power input in the AC input port 20 to thereby control and stabilize the DC voltage of the DC output port 24.

Figure 2:
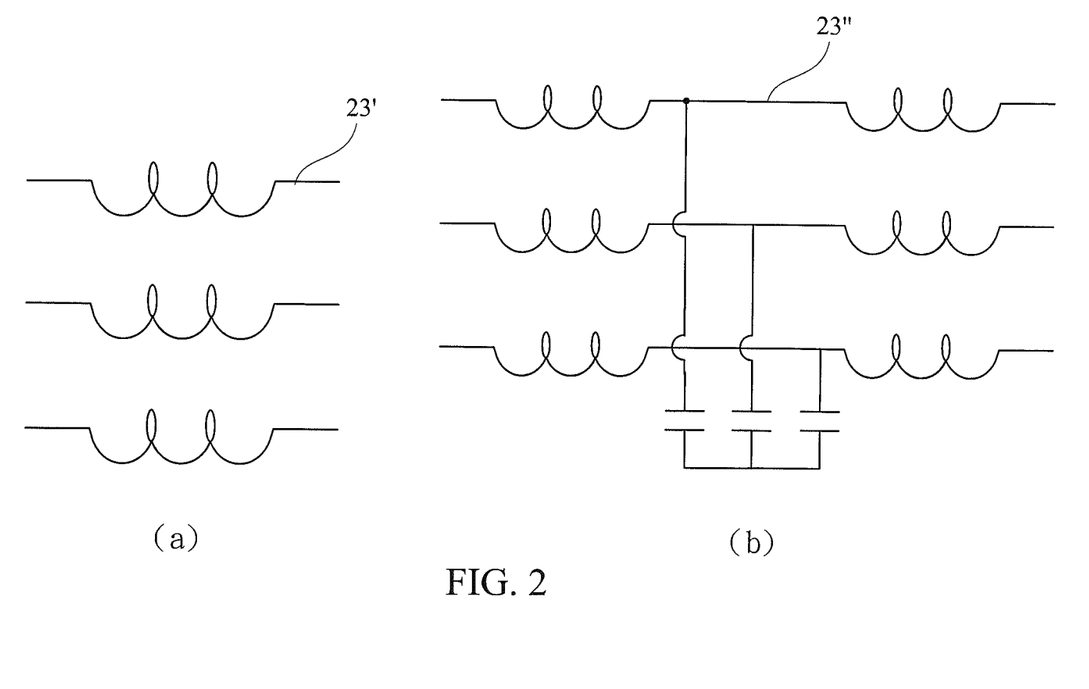
FIGS. 2a and 2b are schematic diagrams of two filter circuits applied in the multilevel AC/DC power converter device in accordance with the preferred embodiment of the present invention.

FIGS. 2a and 2b show two types of filter circuits suitably applied in the multilevel AC/DC power converter device in accordance with the preferred embodiment of the present invention which corresponds to the filter circuit 23 in FIG. 1. Referring to FIGS. 1 and 2a, the filter circuit 23' includes three or a plurality of inductors arranged therein. Referring to FIGS. 1 and 2b, the filter circuit 23" includes a combination of a plurality of inductors and a plurality of capacitors electrically connected.

Figure 3:
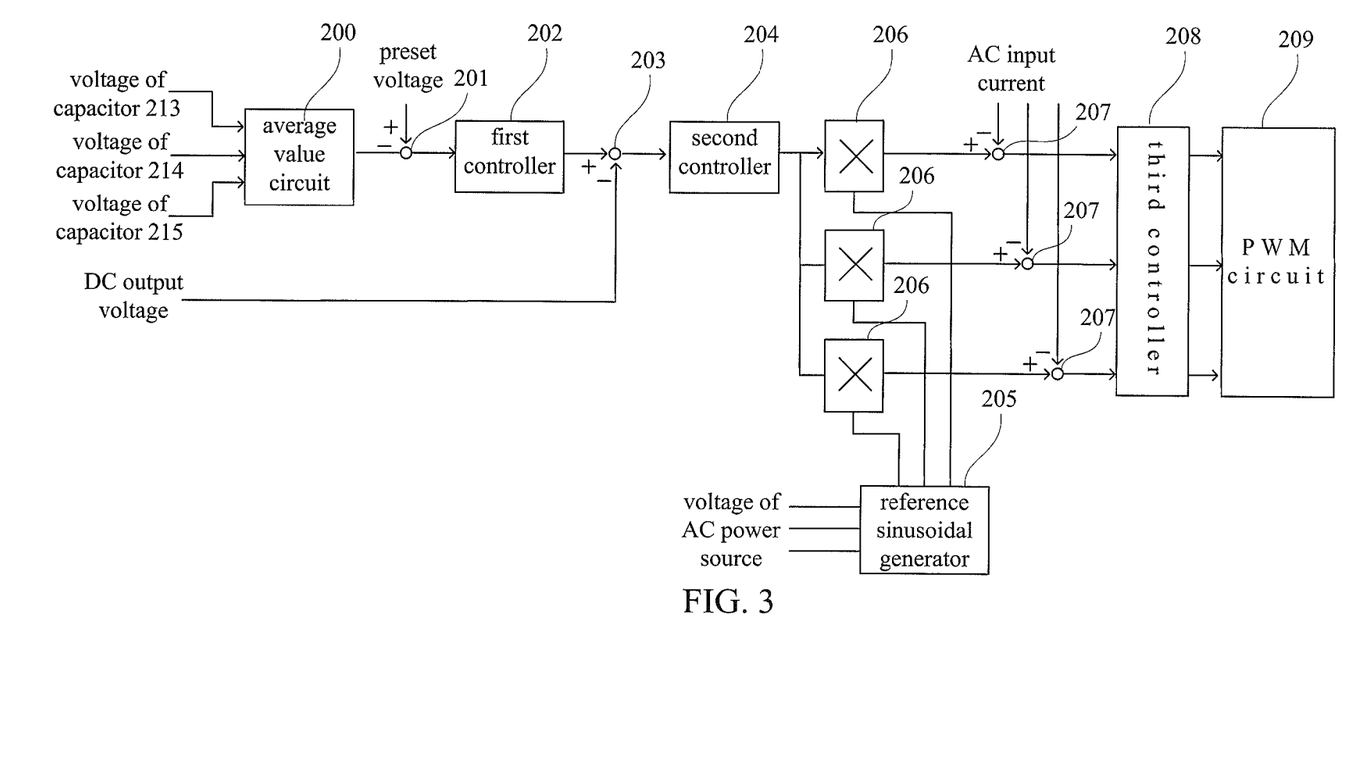
FIG. 3 is a schematic block diagram of a controller applied in the multilevel AC/DC power converter device in accordance with the preferred embodiment of the present invention.

FIG. 3 shows a controller suitably applied in the multilevel AC/DC power converter device in accordance with the preferred embodiment of the present invention which corresponds to the multilevel AC/DC power converter device 2 in FIG. 1. Referring to FIGS. 1 and 3, voltages of the DC capacitors 213, 214, 215 connected with the single-phase full-bridge power converters 210, 211, 212 are detected. The detected voltages of the DC capacitors 213, 214, 215 are sent to an average value circuit 200 and an output of the average value circuit 200, and a preset value are sent to a first subtractor 201 and are compared to obtain a comparison result. The comparison result of the first subtractor 201 is further sent to a first controller 202 whose output is a reference voltage value of the DC port 222 of the low-frequency power converter 22. The output of the first controller 202 and a detected voltage of the DC port 222 of the low-frequency power converter 22 are sent to a second subtractor 203 and are compared to obtain a comparison result. The comparison result of the second subtractor 203 is further sent to a second controller 204 whose output is an amplitude of reference signals of three-phase input currents input from the AC input port 20. A voltage of the AC power source 1 is detected and sent to a reference sinusoidal generator 205 to generate three reference sinusoidal waves each of which formed with a unity amplitude. The three reference sinusoidal waves have phases identical with that of the voltage of the AC power source 1. An output of the second controller 204 is sent to the three multipliers 206 for multiplying it by the three reference sinusoidal waves. Outputs of the three multipliers 206 are reference signals of the three-phase input currents. The outputs of the three multipliers 206 and the detected three-phase input currents are sent to a third subtractor 207 and are compared to obtain a comparison result. The comparison result of the third subtractor 207 is further sent to a third controller 208 whose output is sent to a PWM circuit 209 to generate control signals of power electronic switches of the single-phase full-bridge power converters 210, 211, 212.

Figure 4:
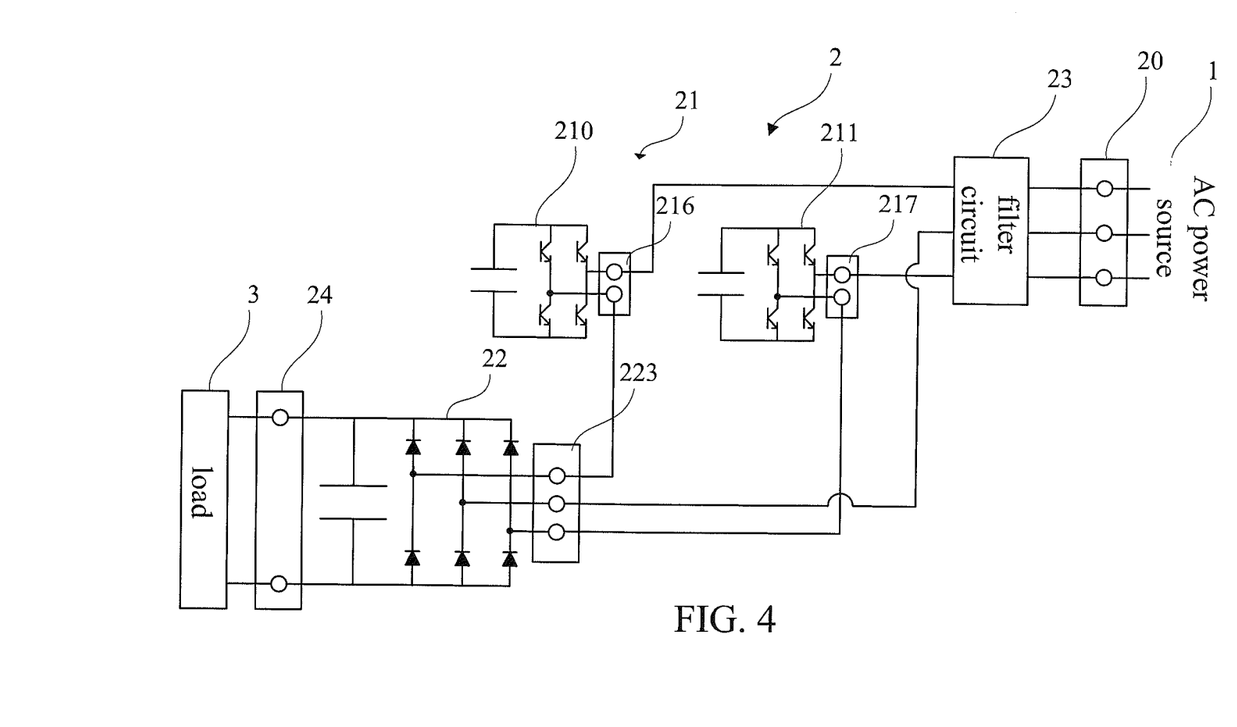
FIG. 4 is a schematic diagram of the multilevel AC/DC power converter device in accordance with a second preferred embodiment of the present invention.

FIG. 4 shows the multilevel AC/DC power converter device in accordance with a second preferred embodiment of the present invention which corresponds to the multilevel AC/DC power converter device 2 in FIG. 1. Referring now to FIGS. 1 and 4, in the second embodiment, the AC power source 1 is selected from a three-phase three-wire AC power source 1'. The multilevel AC/DC power converter device 2 is operated to convert AC power of the three-phase three-wire AC power source 1' into DC power and to supply a DC voltage generated therefrom to the load 3. In comparison with the first embodiment, the high-frequency power converter 21 of the multilevel AC/DC power converter device 2 of the second embodiment includes two single-phase full-bridge power converters 210, 211 and two DC capacitors. The single-phase full-bridge power converters 210, 211 include two AC terminals 216, 217 performed as the first AC port and each of which includes a first terminal point and a second terminal point. The second AC port 223 of the low-frequency power converter 22 includes three AC terminal points. Two of the three AC terminal points of the AC terminal 223 correspondingly connect with the second terminal points of the AC terminals 216, 217 of the single-phase full-bridge power converters 210, 211, while one of the three AC terminal points of the second AC port 223 connects with the AC input port 20 via the filter circuit 23.

Figure 5:
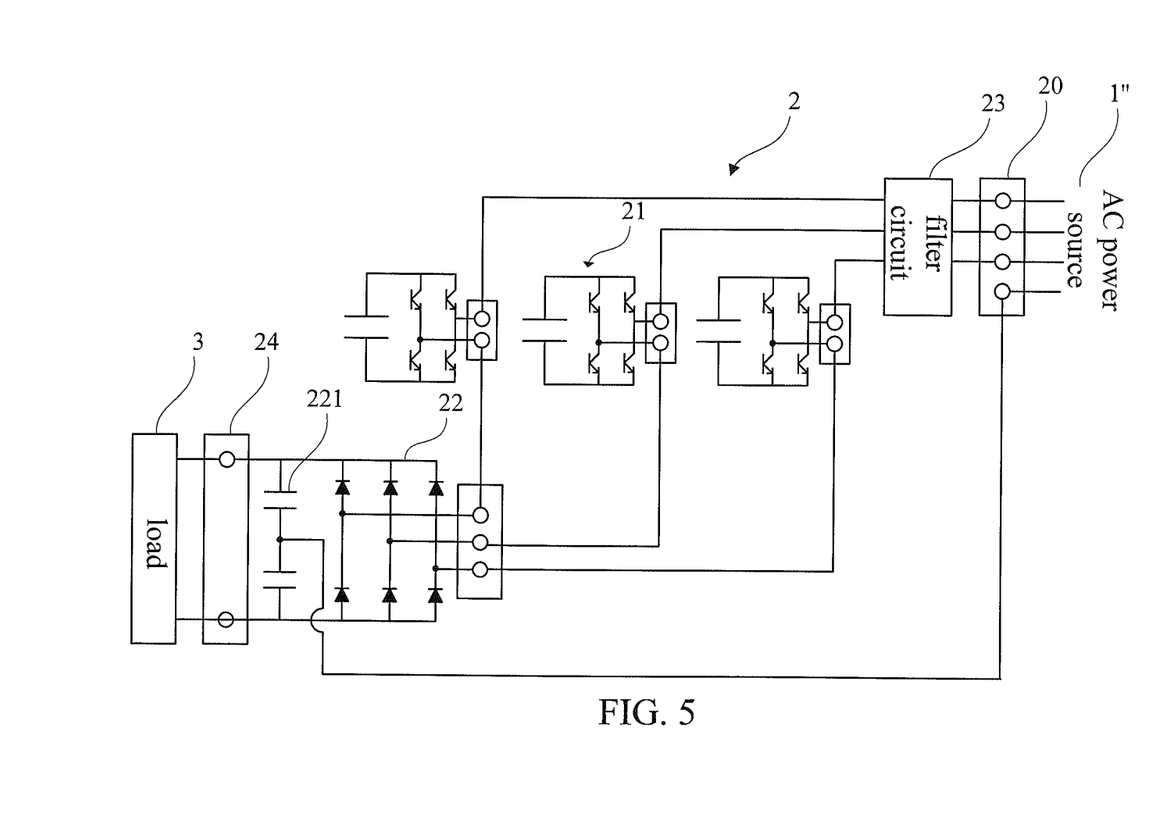
FIG. 5 is a schematic diagram of the multilevel AC/DC power converter device in accordance with a third preferred embodiment of the present invention.

FIG. 5 shows the multilevel AC/DC power converter device in accordance with a third preferred embodiment of the present invention which corresponds to the multilevel AC/DC power converter device 2 in FIG. 1. Referring now to FIGS. 1 and 5, in the third embodiment, the AC power source 1 is selected from a three-phase four-wire AC power source 1". The multilevel AC/DC power converter device 2 is operated to convert AC power of the three-phase four-wire AC power source 1" into DC power and to supply a DC voltage generated therefrom to the load 3. In comparison with the first embodiment, the AC input port 20 of the multilevel AC/DC power converter device 2 of the third embodiment includes an additional terminal connecting with a neutral line of the three-phase four-wire AC power source 1". The DC capacitor 221 of the low-frequency power converter 22 comprises two DC capacitors serially connected. A connection point of the serially-connected two DC capacitors connects with the additional terminal of the AC input port 20 connected to a neutral line of the three-phase four-wire AC power source 1".

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. A multilevel AC/DC power converting method consisting of:
    connecting a high-frequency power converter and a low-frequency power converter between an AC power source and a load in a three-phase three-wire power converter;
    providing a first AC port of the high-frequency power converter and a second AC port of the low-frequency power converter in the three-phase three-wire power converter, and serially connecting the first AC port of the high-frequency power converter to the second AC port of the low-frequency power converter to form a cascade bridge-type multilevel rectifier structure, wherein the high-frequency power converter consists of two single-phase full-bridge power converters and two DC capacitors provided in the three-phase three-wire power converter, with each of the two single-phase full-bridge power converters including an AC terminal performed as the first AC port, with the AC terminal comprising a first terminal point and a second terminal point, wherein the second AC port of the low-frequency power converter includes a first terminal point, a second terminal point and a third terminal point, with the first terminal point and the second terminal point of the second AC port of the low-frequency power converter selectively connecting with the second terminal points of the AC terminals of the single-phase full-bridge power converters while the third terminal point of the second AC port of the low-frequency power converter selectively connecting with the AC input port via a filter circuit;
    operating the low-frequency power converter with a frequency of the AC power source;
    operating the high-frequency power converter with high-frequency PWM to generate a multilevel AC voltage from a serial connection of the low-frequency power converter and the high-frequency power converter;
    controlling the multilevel AC voltage for a current of an AC input port approaching to a sinusoidal waveform and identical with a phase of a voltage of the AC power source, thereby operating a power factor approach to unity;
    controlling a DC voltage output from the low-frequency power converter to supply to the load via a DC output port.

2. The multilevel AC/DC power converting method as defined in claim 1, wherein the low-frequency power converter includes a three-phase diode rectifier, a DC capacitor, a DC terminal performed as a DC port and an AC terminal performed as the second AC port.

3. The multilevel AC/DC power converting method as defined in claim 1, wherein the second AC port of the low-frequency power converter includes three AC terminal points each of which connects with corresponding second terminal points of the AC terminals of the two single-phase full-bridge power converters of the high-frequency power converter.

4. The multilevel AC/DC power converting method as defined in claim 1, wherein DC voltages of the single-phase full-bridge power converters of the high-frequency power converter are adjusted to control an output voltage of a DC port of the low-frequency power converter and to control an amplitude of input currents of the AC input port and appropriately arranging values of the DC voltages of the single-phase full-bridge power converters and the low-frequency power converter, and wherein no real power is input or output at the high-frequency power converter.

5. The multilevel AC/DC power converting method as defined in claim 1, wherein the single-phase full-bridge power converters of the high-frequency power converter connect with corresponding DC capacitors and are not applied to output DC power therefrom, and wherein no additional power conversion circuit is applied to integrate DC outputs from the single-phase full-bridge power converters into a single DC output to the DC output port.

6. The multilevel AC/DC power converting method as defined in claim 1, wherein DC voltages of the single-phase full-bridge power converters of the high-frequency power converter equal a half voltage of a DC terminal of the low-frequency power converter.

7. The multilevel AC/DC power converting method as defined in claim 1, wherein voltages of the DC capacitors of the single-phase full-bridge power converters of the high-frequency power converter are detected and sent to an average value circuit, with an output of the average value circuit and a preset value sent to a first subtractor to obtain a comparison result, with the comparison result of the first subtractor further sent to a first controller to obtain an output as a reference voltage value of the DC terminal of the low-frequency power converter, with the output of the first controller and a detected voltage of the DC terminal of the low-frequency power converter sent to a second subtractor to obtain a comparison result, with the comparison result of the second subtractor further sent to a second controller to obtain an output as an amplitude of reference signals of three-phase input currents input from the AC input port, with a detected voltage of the AC power source sent to a reference sinusoidal generator to generate three reference sinusoidal waves each of which formed with a unity amplitude, with an output of the second controller sent to three multipliers for multiplying the output of the second controller by the three reference sinusoidal waves, with outputs of the three multipliers as reference signals of the three-phase input currents and the detected three-phase input currents sent to a third subtractor to obtain a comparison result, with the comparison result of the third subtractor further sent to a third controller whose output is sent to a PWM circuit to generate control signals of power electronic switches of the single-phase full-bridge power converters.

8. The multilevel AC/DC power converting method as defined in claim 1, wherein the AC input port includes an additional terminal connecting with a neutral line of a three-phase four-wire power source, and wherein the low-frequency power converter includes two DC capacitors whose serial connection points further connect with the additional terminal of the AC input port.

9. A multilevel AC/DC power converter consisting of:
a three-phase three-wire power converter;
an AC input port provided in the three-phase three-wire power converter and connecting with an AC power source;
a high-frequency power converter provided in the three-phase three-wire power converter and including a first AC port, wherein the high-frequency power converter consists of two single-phase full-bridge power converters and two DC capacitors, with each of the two single-phase full-bridge power converters including an AC terminal performed as the first AC port, with the AC terminal comprising a first terminal point and a second terminal point;
a low-frequency power converter provided in the three-phase three-wire power converter and including a second AC port and a DC port, with the first AC port of the high-frequency power converter serially connecting to the second AC port of the low-frequency power converter to form a cascade bridge-type multilevel rectifier structure, wherein the second AC port of the low-frequency power converter includes a first terminal point, a second terminal point and a third terminal point, with the first terminal point and the second terminal point of the second AC port of the low-frequency power converter selectively connecting with the second terminal points of the AC terminals of the two single-phase full-bridge power converters;
a filter circuit provided in the three-phase three-wire power converter and connecting between the first AC port of the high-frequency power converter and the AC input port for filtering harmonics, with the third terminal point of the second AC port of the low-frequency power converter selectively connecting with the AC input port via the filter circuit; and
a DC output port provided in the three-phase three-wire power converter and connecting with the DC port of the low-frequency power converter and supplying stable DC power to at least one load;
wherein the low-frequency power converter is operated with a frequency identical with a frequency of the AC power source; wherein the high-frequency power converter is operated with high-frequency PWM to generate a multilevel AC voltage from a serial connection of the low-frequency power converter and the high-frequency power converter; wherein the multilevel AC voltage is controlled for a current of the AC input port approaching to a sinusoidal waveform and identical with a phase of a voltage of the AC power source, thereby operating a power factor approach to unity; and wherein a DC voltage output from the low-frequency power converter is controlled to supply to the at least one load via the DC output port.

10. The multilevel AC/DC power converter as defined in claim 9, wherein the low-frequency power converter includes a three-phase diode rectifier, a DC capacitor, a DC terminal performed as the DC port and an AC terminal performed as the second AC port.

11. The multilevel AC/DC power converter as defined in claim 9, wherein the second AC port of the low-frequency power converter includes three AC terminal points each of which connects with corresponding second terminal points of AC terminals of the two single-phase full-bridge power converters of the high-frequency power converter.

12. The multilevel AC/DC power converter as defined in claim 9, wherein DC voltages of the single-phase full-bridge power converters of the high-frequency power converter are controlled to adjust an output voltage of the DC terminal of the low-frequency power converter and to control an amplitude of input currents of the AC input port and appropriately arranging values of the DC voltages of the single-phase full-bridge power converters and the low-frequency power converter, and wherein no real power is input or output at the high-frequency power converter.

13. The multilevel AC/DC power converter as defined in claim 9, wherein the single-phase full-bridge power converters of the high-frequency power converter connect with corresponding DC capacitors and are not applied to output DC power therefrom, and wherein no additional power conversion circuit is applied to integrate DC outputs from the single-phase full-bridge power converters into a single DC output to the DC output port.

14. The multilevel AC/DC power converter as defined in claim 9, wherein DC voltages of the single-phase full-bridge power converters of the high-frequency power converter equal a half voltage of a DC terminal of the low-frequency power converter.

15. The multilevel AC/DC power converter as defined in claim 9, wherein voltages of the DC capacitors of the single-phase full-bridge power converters of the high-frequency power converter are detected and sent to an average value circuit, with an output of the average value circuit and a preset value sent to a first subtractor to obtain a comparison result, with the comparison result of the first subtractor further sent to a first controller to obtain an output as a reference voltage value of the DC terminal of the low-frequency power converter, with the output of the first controller and a detected voltage of the DC terminal of the low-frequency power converter sent to a second subtractor to obtain a comparison result, with the comparison result of the second subtractor further sent to a second controller to obtain an output as an amplitude of reference signals of three-phase input currents input from the AC input port, with a detected voltage of the AC power source sent to a reference sinusoidal generator to generate three reference sinusoidal waves each of which formed with a unity amplitude, with an output of the second controller sent to three multipliers for multiplying the output of the second controller by the three reference sinusoidal waves, with outputs of the three multipliers as reference signals of the three-phase input currents and the detected three-phase input currents sent to a third subtractor to obtain a comparison result, with the comparison result of the third subtractor further sent to a third controller whose output is sent to a PWM circuit to generate control signals of power electronic switches of the single-phase full-bridge power converters.

* * * * *